(No Model.)
J. A. MAXWELL.
TILLER WHEEL ON STEAMBOATS, &c.
No. 310,213. Patented Jan. 6, 1885.
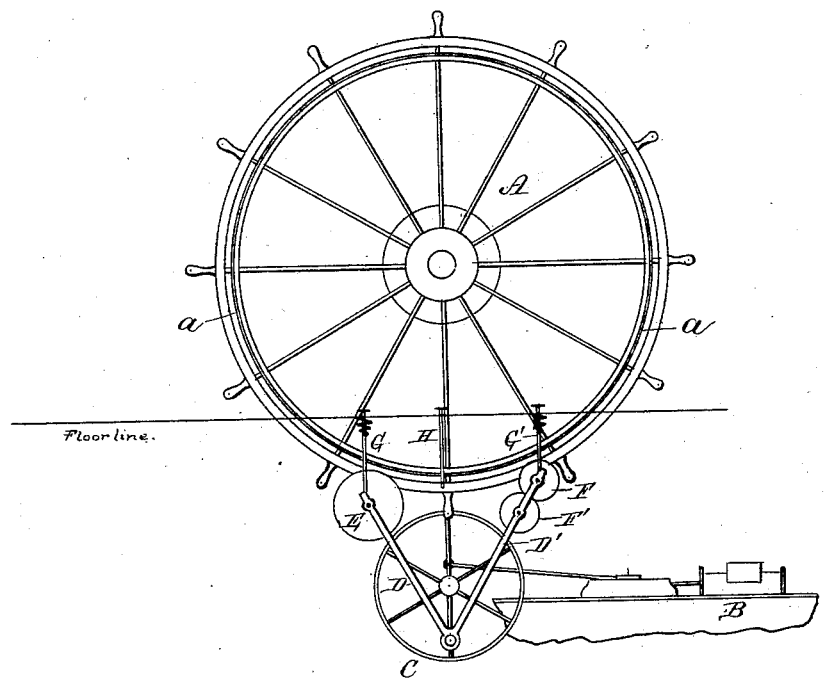
Witnesses.
L. F. Gardner
J. W. Garner
Inventor
Jas. A. Maxwell,
per
J. A. Lehmann,
Atty

UNITED STATES PATENT OFFICE.

JAMES A. MAXWELL, OF ALLEGHENY, PENNSYLVANIA.

TILLER-WHEEL ON STEAMBOATS, &c.

SPECIFICATION forming part of Letters Patent No. 310,213, dated January 6, 1885.

Application filed June 28, 1884. (No model.)

*To all whom it may concern:*

Be it known that I, JAMES A. MAXWELL, a citizen of the United States, residing at Allegheny, in the county of Allegheny and State of Pennsylvania, have invented certain new and useful Improvements in the Management of Tiller-Wheels on Steam-Vessels, of which the following is a specification, reference being had therein to the accompanying drawing.

My invention relates to an improvement in the management of tiller-wheels for steam-vessels; and it consists in an application of steam-power, by which the tiller-wheel is turned, or held in a given position by the pilot's foot depressing treadles, as will be fully described hereinafter.

It frequently occurs during stormy weather that the strength of one man is insufficient to control and hold the tiller-wheel that guides a vessel, and the strength of two men is sometimes insufficient for it. My object is to overcome this difficulty and to enable a pilot to turn the wheel at all times without greater exertion than to place his foot upon a treadle that, when depressed, causes the steam-power to turn the wheel to either side and to hold it in any desired position. To accomplish this I place under the tiller-wheel a small steam-engine that turns a fly-wheel which can be brought in contact with rollers pivoted at the ends of a bell-crank, of which the fulcrum is fixed at a convenient place, so that if one of the rollers is raised by the arm of the lever the one on the other arm is lowered. The raising and lowering of the rollers is effected by stepping on one of two treadles protruding from the foot-board, which causes one of the rollers to be pressed between the revolving fly-wheel and the tiller-wheel, thereby turning the latter in one direction, and by stepping on the other, after releasing the former, turning the tiller-wheel in an opposite direction.

In the accompanying drawings, A represents a tiller-wheel; B, a steam-engine; C, a fly-wheel; D D', a bell-crank; E, a friction-roller; F and F', smaller friction-rollers; G G', treadles. The tiller-wheel A is of the usual construction, but has near its outer rim an inner circle, $a$, made of iron or other strong material, attached to the spokes of the wheel, and covered with rubber or other material that prevents the sliding of the part to which it is applied when in contact with the rollers E or F. Under the tiller-wheel is placed a small steam-engine, B, that turns a fly-wheel, C, which runs free as long as neither of treadles G G' is depressed. At the side of the steam-engine, or at some other convenient place, is fulcrumed a bell-crank, of which the arms D D' are turned upward, and to them are pivoted the treadles G G', that pass up through the foot-board near the tiller-wheel. The treadles are provided under the floor with spiral springs, which, when the pressure on top of the treadles is removed, restore them to their former positions. On the arm D of the bell-crank is a gum roller, E, that, when the treadle G' on the other arm, D', of the bell-crank becomes depressed, is thereby raised and pressed in between the covered iron circle $a$ and the fly-wheel C, causing the tiller-wheel to turn. On the arm D' are two smaller rollers, F and F', in contact with each other, of which the one, F, when the treadle G is depressed, is raised so as to bear against the circle $a$, while the other, F', bears against the fly-wheel, and both revolving together, turn the tiller-wheel in a direction opposite to the former given by the roller E. Hence by using one or the other treadle the pilot can guide his vessel to either side without putting his hands to the wheel. There is in addition to the two treadles described a third one, H, that when pressed upon holds the tiller-wheel firmly in the position in which it may be at the time, but having been in use for a long time forms no part of my invention.

Having thus described my invention, I claim—

1. The combination of the tiller-wheel, a rim, band, or circle secured rigidly to its side, a pivoted crank-lever placed below the wheel and band, friction-wheels which are journaled upon the arms of the lever, a fly-wheel located beneath the tiller, and a mechanism for driving the fly-wheel, the lever being adapted to be moved so as to press the wheel or wheels upon its arms between the rim or band on the tiller-wheel and the fly-wheel, substantially as shown.

2. The combination of the tiller-wheel, the circle rigidly secured to its side, a fly-wheel placed below the tiller-wheel, and a mechanism for driving the fly-wheel, with spring-actuated levers which have friction-wheels journaled upon them, and which wheels are moved by the levers, so as to bear against both the fly-wheel and the circle, substantially as set forth.

3. The combination of the tiller-wheel, a circle rigidly secured thereto, the fly-wheel, and a mechanism for driving it, with the pivoted crank-lever, having a spring applied to each arm, and the friction-wheels E F F', journaled upon the arms, substantially as described.

In testimony whereof I affix my signature in presence of two witnesses.

JAMES A. MAXWELL.

Witnesses:
LOUIS MOESER,
TG. STAUFFER.